US008386152B2

(12) United States Patent
Ichimoto et al.

(10) Patent No.: US 8,386,152 B2
(45) Date of Patent: Feb. 26, 2013

(54) INTERNAL COMBUSTION ENGINE SYSTEM, VEHICLE EQUIPPED WITH INTERNAL COMBUSTION ENGINE SYSTEM, AND CONTROL METHOD OF INTERNAL COMBUSTION ENGINE SYSTEM

(75) Inventors: Kazuhiro Ichimoto, Nisshin (JP); Tsukasa Abe, Gotenba (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 948 days.

(21) Appl. No.: 12/297,415

(22) PCT Filed: Apr. 10, 2007

(86) PCT No.: PCT/JP2007/057872
§ 371 (c)(1),
(2), (4) Date: Oct. 16, 2008

(87) PCT Pub. No.: WO2007/123020
PCT Pub. Date: Nov. 1, 2007

(65) Prior Publication Data
US 2009/0099757 A1 Apr. 16, 2009

(30) Foreign Application Priority Data
Apr. 24, 2006 (JP) .................................. 2006-119060

(51) Int. Cl.
*G06F 7/00* (2006.01)
*F01L 1/34* (2006.01)
(52) U.S. Cl. .................................... 701/106; 123/90.15
(58) Field of Classification Search .................. 701/106; 123/90.15, 90.16, 90.17, 90.18, 321, 345, 123/346, 347, 348
See application file for complete search history.

(56) References Cited

U.S. PATENT DOCUMENTS

| 6,161,511 | A  | * | 12/2000 | Hashimoto | ................ | 123/90.15 |
| 6,170,446 | B1 | * | 1/2001  | Hashimoto | ................ | 123/90.15 |
| 7,210,450 | B2 | * | 5/2007  | Arinaga et al. | ........... | 123/339.19 |

FOREIGN PATENT DOCUMENTS

| JP | 11-132013 A | 5/1999 |
| JP | 2000-008895 A | 1/2000 |
| JP | 2000-230437 A | 8/2000 |
| JP | 2001-082194 A | 3/2001 |
| JP | 2002-227668 A | 8/2002 |
| JP | 2003-041977 A | 2/2003 |
| JP | 2003-120374 A | 4/2003 |
| JP | 2003-201870 A | 7/2003 |
| JP | 2005-299578 A | 10/2005 |

* cited by examiner

*Primary Examiner* — Mahmoud Gimie
*Assistant Examiner* — David Hamaoui
(74) *Attorney, Agent, or Firm* — Kenyon & Kenyon LLP

(57) ABSTRACT

Upon satisfaction of an idle learning condition, the internal combustion engine system of the invention successively performs learning of an idle control amount and learning of a most delayed angle control amount in this sequence. Upon satisfaction of a most delayed angle learning condition, on the other hand, the internal combustion engine system successively performs learning of the most delayed angle control amount and learning of the idle control amount in this sequence. This arrangement effectively reduces the total time required for completion of learning both the idle control amount and the most delayed angle control amount, compared with the conventional procedure of individually learning only one control amount corresponding to the satisfied learning condition.

9 Claims, 7 Drawing Sheets

INTERNAL COMBUSTION ENGINE SYSTEM, VEHICLE EQUIPPED WITH INTERNAL COMBUSTION ENGINE SYSTEM, AND CONTROL METHOD OF INTERNAL COMBUSTION ENGINE SYSTEM

This is a 371 national phase application of PCT/JP2007/057872 filed 10 Apr. 2007, claiming priority to Japanese Patent Application No. JP 2006-119060 filed 24 Apr. 2006, the contents of which are incorporated herein by reference.

TECHNICAL FIELD

The present invention relates to an internal combustion engine system, a vehicle equipped with internal combustion engine system, and a control method of internal combustion engine system.

BACKGROUND ART

One proposed structure of an internal combustion engine system varies the open-close timing of an intake valve to freely change a relative phase difference between the open-close timing of an exhaust valve and the open-close timing of the intake vale within a predetermined angle range. A phase angle having a least overlap between the open timing of the exhaust valve and the close timing of the intake valve is learnt as a most delayed phase angle.
Patent Document 1: Japanese Patent Laid-Open No. 2003-120374

DISCLOSURE OF THE INVENTION

The internal combustion engine system of a prior art configuration learns a control amount required to idle an internal combustion engine as an idle control amount, as well as a control amount required to set the phase angle of the intake valve to the most delayed phase angle as a most delayed phase angle control amount. In the system learning the multiple control amounts, it is naturally required to adequately learn these control amounts. Individual learning of only the most delayed phase angle control amount upon satisfaction of a learning condition for the most delayed angle control amount and individual learning of only the idle control amount upon satisfaction of a learning condition for the idle control amount may undesirably lengthen the total time required for completion of learning both the control amounts. In a hybrid vehicle driven with output power of an engine and output power of a motor, the engine may be restarted from the stop state to satisfy the learning condition and perform learning of the corresponding control amount. Individual learning of only the control amount corresponding to the satisfied learning condition undesirably increases the frequency of restarting the engine for learning.

In the internal combustion engine system, the vehicle equipped with the internal combustion engine system, and the control method of the internal combustion engine system, there would thus be a demand for reducing the total time required for completion of learning both a control amount required to idle an internal combustion engine as an idle control amount and a control amount required to set an open-close timing of an intake valve to a specific open-close timing as an open-close timing control amount. In the vehicle equipped with an internal combustion engine that is restarted from a stop state to perform learning of the idle control amount and learning of the open-close timing control amount, there would also be a demand for reducing the frequency of restarting the internal combustion engine for learning.

The present invention accomplishes at least part of the demands mentioned above and the other relevant demands by the following configurations applied to the internal combustion engine system, the vehicle equipped with the internal combustion engine system, and the control method of the internal combustion engine system.

One aspect of the invention pertains to an internal combustion engine system equipped with an open-close timing variation mechanism constructed to vary an open-close timing of an intake valve for an internal combustion engine. The internal combustion engine system has: a learning instruction module configured to, upon satisfaction of an idle learning condition for learning a control amount required to idle the internal combustion engine as an idle control amount or upon satisfaction of an open-close timing learning condition for learning a control amount required to set an open-close timing of the intake valve to a specific open-close timing as an open-close timing control amount, give a learning instruction to perform learning of the idle control amount and learning of the open-close timing control amount; an idle learning module configured to learn the idle control amount, in response to the learning instruction given by the learning instruction module; and an open-close timing learning module configured to learn the open-close timing control amount, in response to the learning instruction given by the learning instruction module.

Upon satisfaction of the idle learning condition for learning the control amount required to idle the internal combustion engine as the idle control amount or upon satisfaction of the open-close timing learning condition for learning the control amount required to set the open-close timing of the intake valve to the specific open-close timing as the open-close timing control amount, the internal combustion engine system according to this aspect of the invention gives the learning instruction to perform learning of the idle control amount and learning of the open-close timing control amount. The internal combustion engine system then actually learns the idle control amount in response to the learning instruction and learns the open-close timing control amount in response to the learning instruction. This arrangement effectively reduces the total time required for completion of learning both the idle control amount and the open-close timing control amount, compared with the conventional procedure of individually learning only one of the idle control amount and the open-close timing control amount corresponding to the satisfied learning condition. The specific open-close timing may be a most delayed open-close timing among available options of the open-close timing of the intake valve.

In one preferable application of the internal combustion engine system according to the above aspect of the invention, the learning instruction module does not instruct the idle learning module to learn the idle control amount when the open-close timing learning condition is satisfied after completion of learning the idle control amount by the idle learning module, while not instructing the open-close timing learning module to learn the open-close timing control amount when the idle learning condition is satisfied after completion of learning the open-close timing control amount by the open-close timing learning module. This arrangement desirably avoids unnecessary relearning of the same control amount after completion of learning.

In another preferable application of the internal combustion engine system according to the above aspect of the invention, the learning instruction module gives the learning instruction, upon satisfaction of the idle learning condition, to successively perform learning of the idle control amount by the idle learning module and learning of the open-close timing control amount by the open-close timing learning module in this sequence, while giving the learning instruction, upon satisfaction of the open-close timing learning condition, to successively perform learning of the open-close timing control amount by the open-close timing learning module and learning of the idle control amount by the idle learning module in this sequence. Learning of a control amount corresponding to the satisfied learning condition is performed first. This arrangement ensures smooth learning of both the idle control amount and the open-close timing control amount.

In one preferable application of the internal combustion engine system according to the above aspect of the invention, the learning instruction module determines satisfaction of the idle learning condition and gives the learning instruction, when the internal combustion engine idles. In one preferable embodiment of this application, the internal combustion engine system further has: an intake air flow regulator configured to regulate an intake air flow into the internal combustion engine; and an intake air flow regulation controller configured to control the intake air flow regulator to satisfy the idle learning condition, in response to an instruction given by the learning instruction module. The learning instruction module instructs the open-close timing learning module, upon satisfaction of the open-close timing learning condition, to learn the open-close timing control amount, instructs the intake air flow regulator to satisfy the idle learning condition after completion of learning the open-close timing control amount by the open-close timing learning module, and instructs the idle learning module to learn the idle control amount after satisfaction of the idle learning condition. The internal combustion engine system of this embodiment learns the open-close timing control amount upon satisfaction of the open-close timing learning condition, and regulates the intake air flow into the internal combustion engine after completion of learning the open-close timing control amount. Learning of the idle control amount is performed when the idle learning condition is satisfied by the regulation of the intake air flow.

In another preferable application of the internal combustion engine system according to the above aspect of the invention, the learning instruction module determines satisfaction of the open-close timing learning condition and gives the learning instruction, when the open-close timing of the intake valve is in a predetermined range including the specific open-close timing. In one preferable embodiment of this application, the internal combustion engine system further has an open-close timing variation controller configured to control the open-close timing variation mechanism to satisfy the open-close timing learning condition in response to an instruction given by the learning instruction module. The learning instruction module instructs the idle learning module, upon satisfaction of the idle learning condition, to lean the idle control amount, instructs the open-close timing variation controller to satisfy the open-close timing learning condition after completion of learning the idle control amount by the idle learning module, and instructs the open-close timing learning module to learn the open-close timing control amount after satisfaction of the open-close timing learning condition. The internal combustion engine system of this embodiment learns the idle control amount upon satisfaction of the idle learning condition, and varies the open-close timing of the intake valve after completion of learning the idle control amount. Learning of the open-close timing control amount is performed when the open-close timing learning condition is satisfied by the variation of the open-close timing of the intake valve.

According to another aspect, the invention is also directed to a vehicle equipped with the internal combustion engine system having any of the arrangements discussed above to output power to an axle and with a motor configured to enable power output to the axle. The vehicle according to this aspect of the invention is equipped with the internal combustion engine system of the invention having any of the configurations discussed above and thus exerts the similar effects to those of the internal combustion engine system described above. The vehicle of the invention thus effectively reduces the total time required for completion of learning both the idle control amount and the open-close timing control amount, compared with the conventional procedure of individually learning only one of the idle control amount and the open-close timing control amount corresponding to the satisfied learning condition. Upon satisfaction of the idle learning condition or upon satisfaction of the open-close timing learning condition, the vehicle of the invention performs both learning of the idle control amount and learning of the open-close timing control amount. In the vehicle equipped with the internal combustion engine that is restarted from the stop state to satisfy the idle learning condition for learning the idle control amount or to satisfy the open-close timing learning condition for learning the open-close timing control amount, this arrangement desirably reduces the frequency of restarting the internal combustion engine for learning. The vehicle may additionally be equipped with an electric power-mechanical power input output structure connected with an output shaft of the internal combustion engine and with the axle of the vehicle and structured to output at least part of power of the internal combustion engine to the axle accompanied by input and output of electric power and mechanical power. The electric power-mechanical power input output structure may have: a three shaft-type power input output assembly connected with three shafts, the output shaft of the internal combustion engine, a driveshaft linked with the axle, and a rotating shaft and designed to input and output power to a residual shaft based on powers input from and output to any two shafts among the three shafts; a generator constructed to enable power input and power output from and to the rotating shaft; and a motor constructed to enable power input and power output from and to the axle.

According to still another aspect, the invention is further directed to a control method of an internal combustion engine system equipped with an open-close timing variation mechanism constructed to vary an open-close timing of an intake valve for an internal combustion engine. Upon satisfaction of an idle learning condition for learning a control amount required to idle the internal combustion engine as an idle control amount or upon satisfaction of an open-close timing learning condition for learning a control amount required to set an open-close timing of the intake valve to a specific open-close timing as an open-close timing control amount, the control method gives a learning instruction to perform learning of the idle control amount and learning of the open-close timing control amount, learns the idle control amount in response to the learning instruction, and learns the open-close timing control amount in response to the learning instruction.

Upon satisfaction of the idle learning condition for learning the control amount required to idle the internal combustion engine as the idle control amount or upon satisfaction of the open-close timing learning condition for learning the control amount required to set the open-close timing of the intake valve to the specific open-close timing as the open-close timing control amount, the control method of the internal combustion engine system according to this aspect of the invention gives the learning instruction to perform learning of the idle control amount and learning of the open-close timing control amount. The control method of the internal combustion engine system then actually learns the idle control amount in response to the learning instruction and learns the open-close timing control amount in response to the learning instruction. This arrangement effectively reduces the total time required for completion of learning both the idle control amount and the open-close timing control amount, compared with the conventional procedure of individually learning only one of the idle control amount and the open-close timing control amount corresponding to the satisfied learning condition. The specific open-close timing may be a most delayed open-close timing among available options of the open-close timing of the intake valve.

BEST MODES OF CARRYING OUT THE INVENTION

One mode of carrying out the invention is described below as a preferred embodiment with reference to the accompanied drawings.

Figure 1:
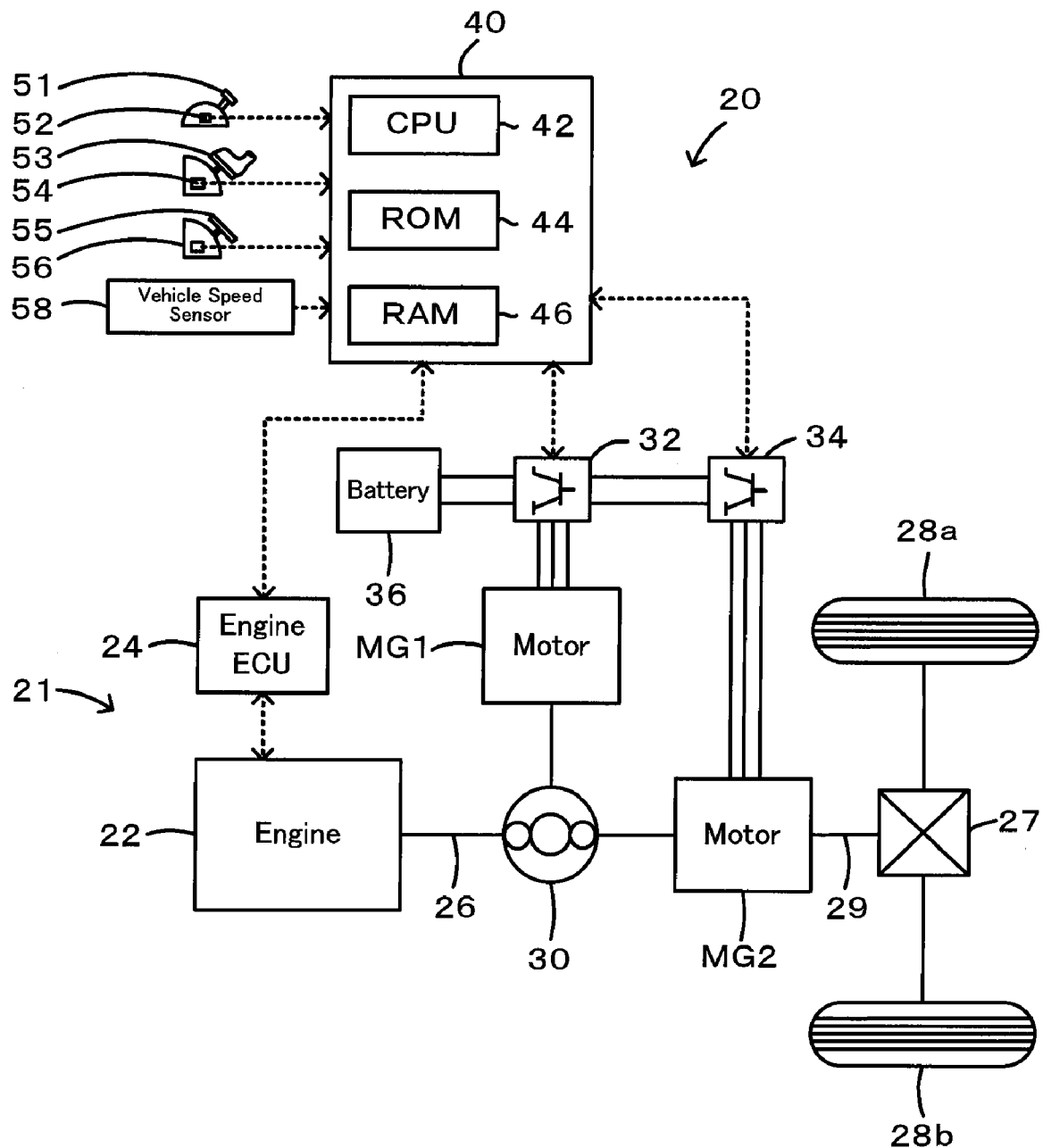
FIG. 1 schematically illustrates the configuration of a hybrid vehicle 20 in one embodiment of the invention.

FIG. 1 schematically illustrates the configuration of a hybrid vehicle 20 equipped with an internal combustion engine system 21 in one embodiment of the invention. As illustrated, the hybrid vehicle 20 of the embodiment has the internal combustion engine system 21 consisting of an engine 22 and an engine ECU 24, a planetary gear mechanism 30 having a carrier connected with a crankshaft 26 or an output shaft of the engine 22 and a ring gear connected with a driveshaft 29 linked to drive wheels 28a and 28b via a differential gear 27, a motor MG1 connected with a sun gear of the planetary gear mechanism 30, a motor MG2 connected with the driveshaft 29, a battery 36 electrically connected with inverters 32 and 34 to drive the motors MG1 and MG2, and an electronic control unit 40 configured to control the operations of the whole hybrid vehicle 20.

Figure 2:
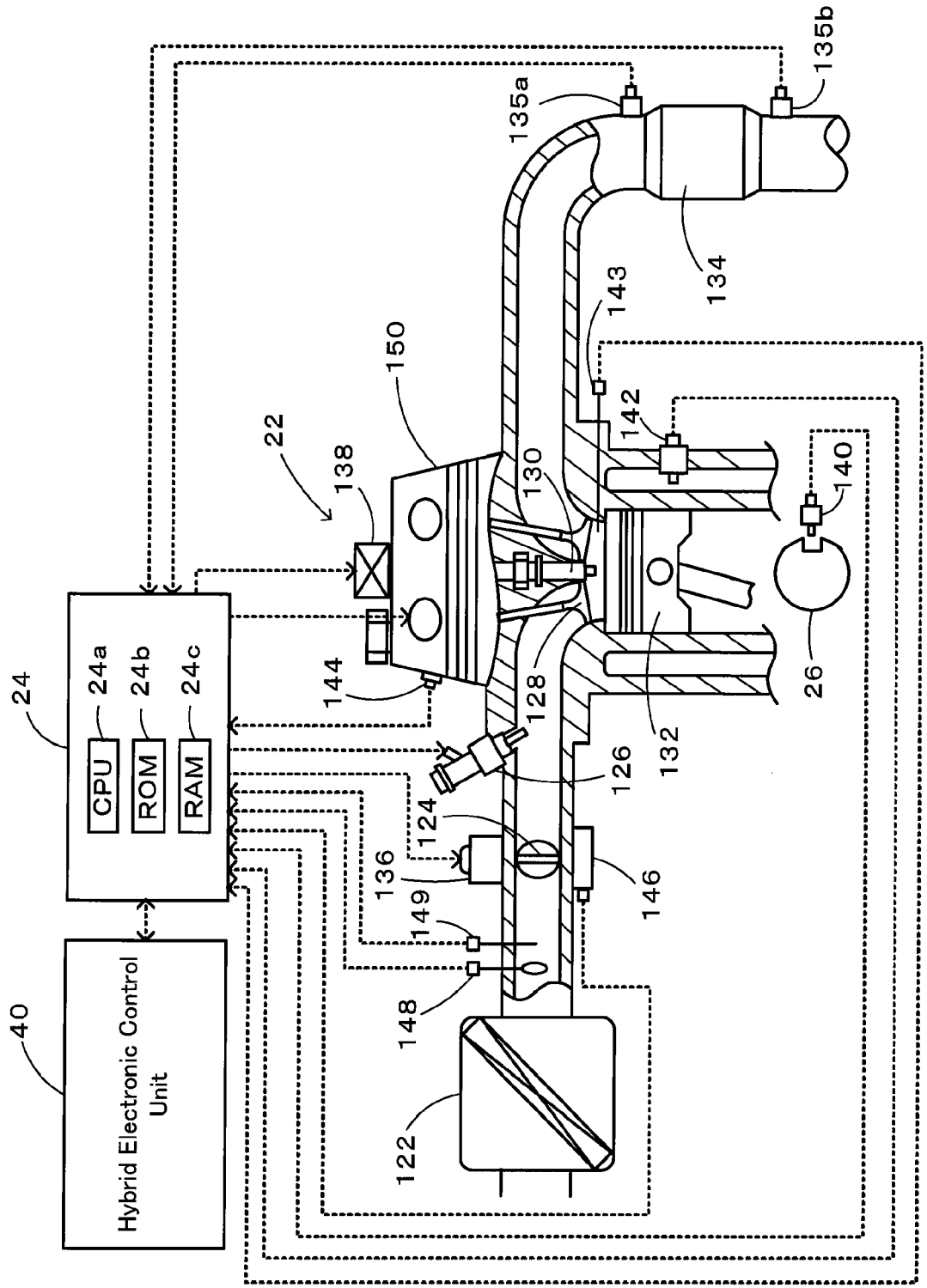
FIG. 2 shows the schematic structure of an engine 22.

The engine 22 is constructed as an internal combustion engine designed to consume a hydrocarbon fuel, such as gasoline or light oil, and thereby output power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 designed to convert toxic components included in the exhaust, that is, carbon monoxide (CO), hydrocarbons (HC), and nitrogen oxides (NOx), into harmless components and is discharged to the outside air.

Figure 3:
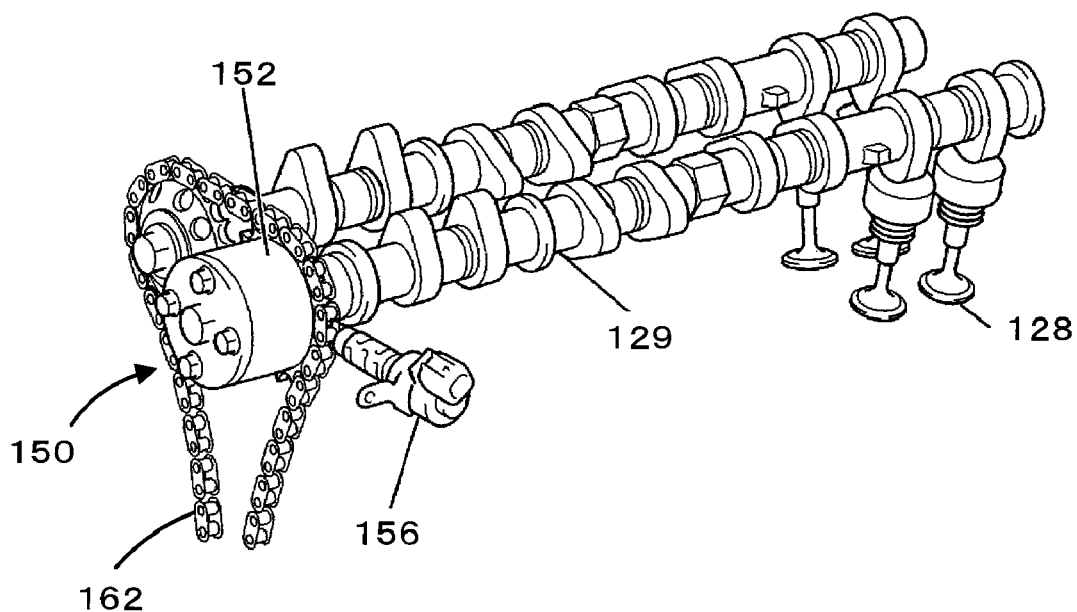
FIG. 3 shows the appearance of a variable valve timing mechanism 150.
Figure 4:
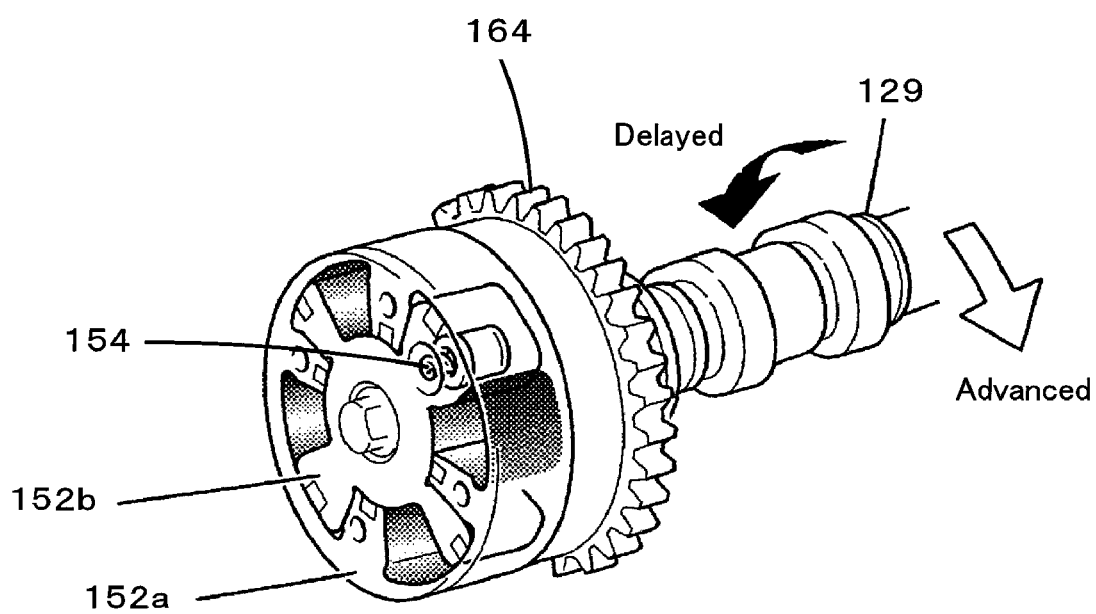
FIG. 4 shows the schematic structure of the variable valve timing mechanism 150.
Figure 5:
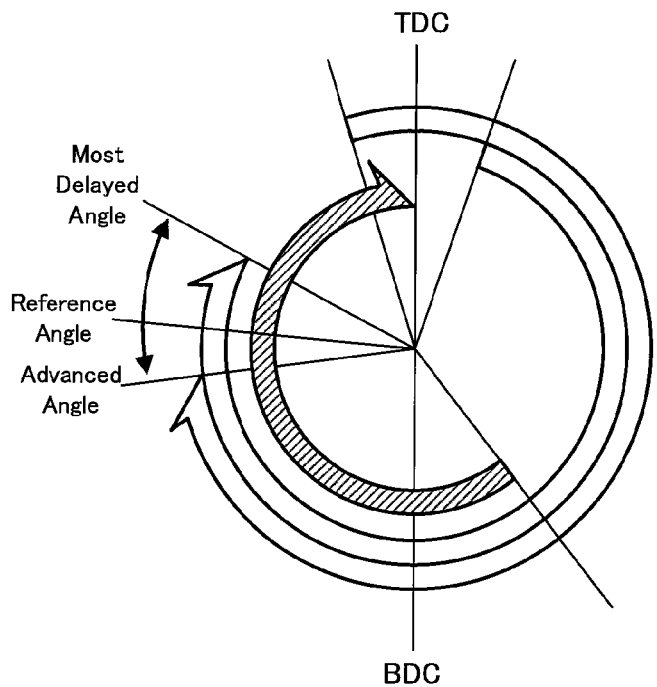
FIG. 5 shows the open-close timing of an intake valve 128 at an advanced angle of an intake camshaft 129 and the open-close timing of the intake valve 128 at a delayed angle of the intake camshaft 129.

The engine 22 also has a variable valve timing mechanism 150 constructed to continuously vary an open-close timing of the intake valve 128. FIGS. 3 and 4 show the schematic structure of the variable valve timing mechanism 150. As illustrated, the variable valve timing mechanism 150 includes a vane-type VVT controller 152 and an oil control valve 156. The vane-type VVT controller 152 has a housing element 152a fastened to a timing gear 164 connected with the crankshaft 26 via a timing chain 162, and a vane element 152b fastened to an intake camshaft 129 arranged to open and close the intake valve 128. The oil control valve 156 is designed to apply a hydraulic pressure to an advance chamber and a delay chamber of the VVT controller 152. Regulation of the hydraulic pressure applied to the advance chamber and the delay chamber of the VVT controller 152 via the oil control valve 156 rotates the vane element 152b relative to the housing element 152a to continuously vary the angle of the intake camshaft 129 at the open-close timing of the intake valve 128. FIG. 5 shows the open-close timing of the intake valve 128 at an advanced angle of the intake camshaft 129 and the open-close timing of the intake valve 128 at a delayed angle of the intake camshaft 129. In the description below, a reference angle represents the angle of the intake camshaft 129 at the open-close timing of the intake valve 128 to ensure efficient power output from the engine 22. Advancing the angle of the intake camshaft 129 from the reference angle causes the engine 22 to be driven in an operation state of enabling output of a high torque. Delaying the angle of the intake camshaft 129 to its most delayed angle decreases a pressure variation in the cylinders of the engine 22 and causes the engine 22 to be driven in an operation state suitable for a stop and a start of the engine 22.

Figure 6:
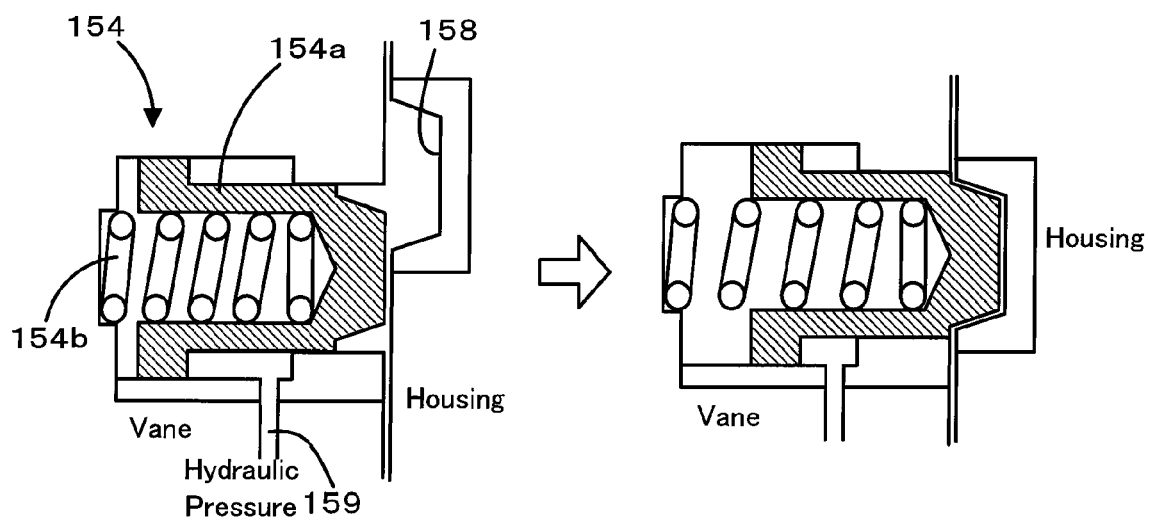
FIG. 6 shows the schematic structure of a lock pin 154.

A lock pin 154 is set on the vane element 152b of the VVT controller 152 to fix the relative rotation of the vane element 152b to the housing element 152a. The schematic structure of the lock pin 154 is shown in FIG. 6. As illustrated, the lock pin 154 has a lock pin body 154a and a spring 154b arranged to press the lock pin body 154a toward the housing element 152a. At the most delayed angle of the intake camshaft 129, the lock pin body 154a of the lock pin 154 is fit in a groove 158 formed in the housing element 152a by the pressing force of the spring 154b, so that the vane element 152b is fastened to the housing element 152a. A non-illustrated hydraulic actuator is provided to apply a hydraulic pressure exceeding the pressing force of the spring 154b via an oil path 159. The applied hydraulic pressure enables the lock pin body 154a of the lock pin 154 to be pulled out of the groove 158.

The engine 22 is under control of an engine electronic control unit (hereafter referred to as engine ECU 24). The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature Tw from a water temperature sensor 142 measured as the temperature of cooling water in the engine 22, an in-cylinder pressure Pin from a pressure sensor 143 provided in the combustion chamber, cam positions from a cam position sensor 144 detected as the rotational position of the intake camshaft 129 driven to open and close the intake valve 128 for gas intake and exhaust into and from the combustion chamber and the rotational position of an exhaust camshaft driven to open and close an exhaust valve, a throttle position from a throttle valve position sensor 146 detected as the position of the throttle valve 124, an air flow meter signal AF from an air flow meter 148 provided in an air intake conduit, an intake air temperature from a temperature sensor 149 provided in the air intake conduit, an air-fuel ratio from an air fuel ratio sensor 135*a*, and an oxygen signal from an oxygen sensor 135*b*. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, and control signals to the variable valve timing mechanism 150 to vary the open-close timing of the intake valve 128. The engine ECU 24 learns a control amount for idling the engine 22 as an idle control amount and a control amount for delaying the open-close timing of the intake valve 128 to the most delayed angle as a most delayed angle control amount. The engine ECU 24 establishes communication with the electronic control unit 40 to drive and control the engine 22 in response to control signals received from the electronic control unit 40 and to output data regarding the operating conditions of the engine 22 to the electronic control unit 40 according to the requirements.

The electronic control unit 40 is constructed as a microprocessor including a CPU 42, a ROM 44 configured to store processing programs, a RAM 46 configured to temporarily store data, input and output ports (not shown), and a communication port (not shown). The electronic control unit 40 inputs, via its input port, an ignition signal from an ignition switch 50, a gearshift position SP or a current setting position of a gearshift lever 51 from a gearshift position sensor 52, an accelerator opening Acc or the driver's depression amount of an accelerator pedal 53 from an accelerator pedal position sensor 54, a brake pedal position BP or the driver's depression amount of a brake pedal 55 from a brake pedal position sensor 56, and a vehicle speed V from a vehicle speed sensor 58. The electronic control unit 40 outputs driving signals via its output port to the inverters 32 and 34 to drive the motors MG1 and MG2. As explained previously, the electronic control unit 50 is connected with the engine ECU 24 via its communication port to transmit various control signals and data to and from the engine ECU 24.

The hybrid vehicle 20 of the embodiment thus constructed calculates a torque demand to be output to the ring gear shaft 32*a* functioning as the drive shaft, based on observed values of the vehicle speed V and the accelerator opening Acc, which corresponds to a driver's depression amount of the accelerator pedal 53. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of the battery 50. The motor drive mode stops the operations of the engine 22 and drives and controls the motor MG2 to output a quantity of power equivalent to the required level of power to the ring gear shaft 32*a*.

Figure 7:
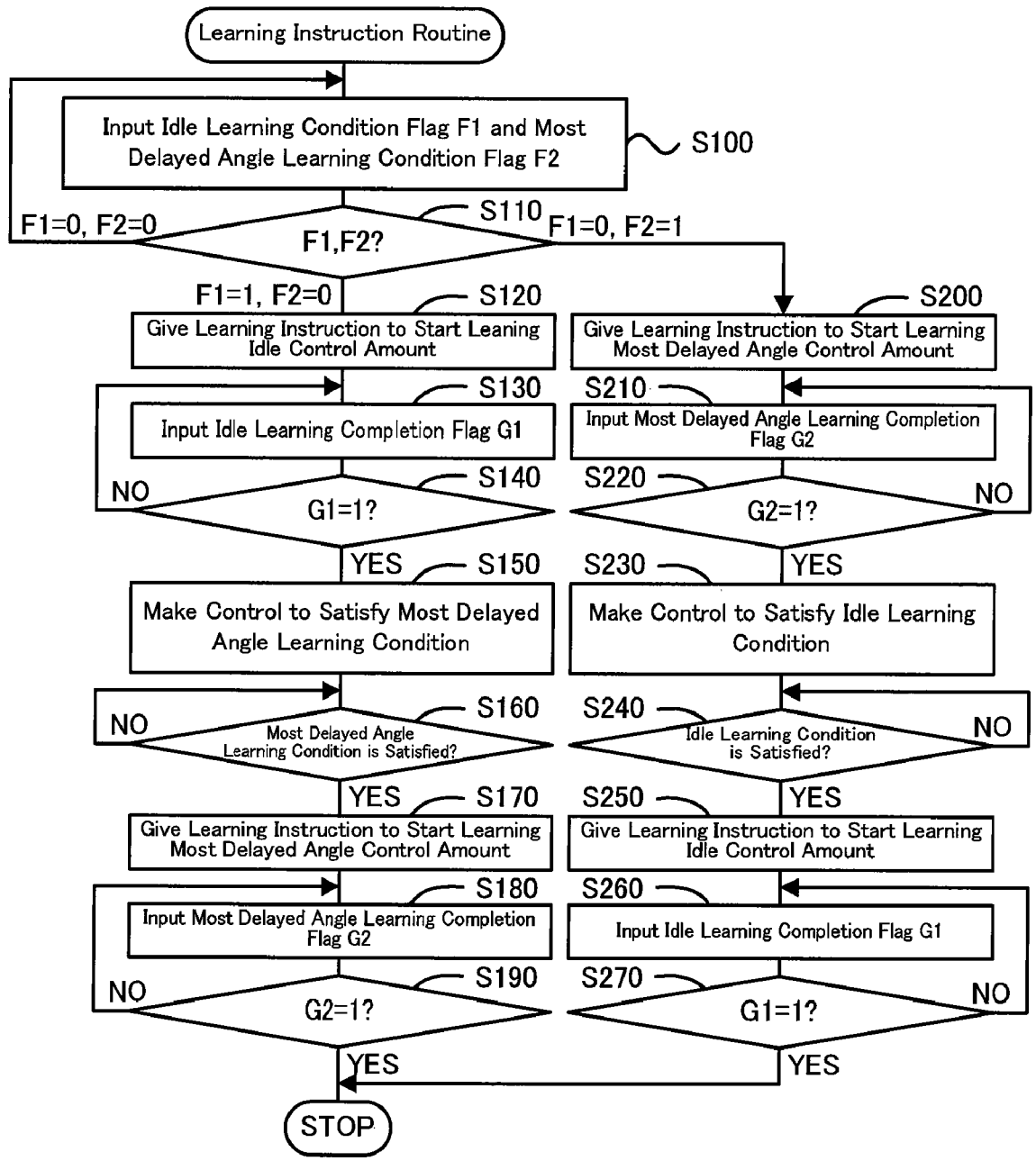
FIG. 7 is a flowchart showing a learning instruction routine executed by an engine ECU 24 of the embodiment.

The description regards the operations of the hybrid vehicle 20 of the embodiment having the configuration discussed above, especially a series of control to learn the idle control amount or the control amount for idling the engine 22 and the most delayed angle control amount or the control amount for setting the open-close timing of the intake valve 128 to the most delayed angle. FIG. 7 is a flowchart showing a learning instruction routine executed by the engine ECU 24. The learning instruction routine is performed in the case of incomplete learning of at least one of the idle control amount and the most delayed angle control amount. Completion or incompletion of learning the idle control amount is detected, for example, by checking the value of an idle learning completion flag G1. The idle learning completion flag G1 is reset to 0 as an initial value and is set to 1 upon completion of learning the idle control amount. Completion or incompletion of learning the most delayed angle control amount is detected, for example, by checking the value of a most delayed angle learning completion flag G2. The most delayed angle learning completion flag G2 is reset to 0 as an initial value and is set to 1 upon completion of learning the most delayed angle control amount. The idle learning completion flag G1 and the most delayed angle learning completion flag G2 will be described later in detail.

In the learning instruction routine, the CPU 24*a* of the engine ECU 24 first inputs an idle learning condition flag F1 and a most delayed angle learning condition flag F2 (step S100). The CPU 24*a* checks the settings of the input idle learning condition flag F1 and the input most delayed angle learning condition flag F2 and waits for setting either one of the idle learning condition flag F1 and the most delayed angle learning condition flag F2 to 1 (step S110). The idle learning condition flag F1 is reset to 0 upon dissatisfaction of an idle learning condition for learning the idle control amount, while being set to 1 upon satisfaction of the idle learning condition according to an idle learning condition flag setting routine (not shown). The CPU 24*a* inputs the setting of the idle learning condition flag F1 written in the RAM 24*c*. Satisfaction of the idle learning condition for learning the idle control amount is determined on the premise of satisfaction of all preset conditions, for example, a condition that the engine 22 idles and a condition that the cooling water temperature Tw of the engine 22 input from the water temperature sensor 142 is not lower than a preset reference temperature (for example, 65 degrees or 70 degrees). The most delayed angle learning condition flag F2 is reset to 0 upon dissatisfaction of a most delayed angle learning condition for learning the most delayed angle control amount, while being set to 1 upon satisfaction of the most delayed angle learning condition according to a most delayed angle learning condition flag setting routine (not shown). The CPU 24a inputs the setting of the most delayed angle learning condition flag F2 written in the RAM 24c. Satisfaction of the most delayed angle learning condition for learning the most delayed angle is determined on the premise of satisfaction of all preset conditions, for example, a condition that the open-close timing of the intake valve 128 is sufficiently close to the most delayed angle (for example, in a specific angle range including the most delayed angle and allowing an advance of 1 degree, 2 degrees, or 3 degrees from the most delayed angle) and a condition that a rotation speed Ne of the engine 22 is not lower than an idle rotation speed Nidl or a rotation speed of slightly less than the idle rotation speed Nidl. The processing of steps S100 and S110 waits for satisfaction of either the idle learning condition or the most delayed angle learning condition. In the hybrid vehicle 20 of the embodiment, during the idling operation of the engine 22, the open-close timing of the intake valve 128 is set to a slightly advanced open-close timing from the most delayed angle. Such setting prevents simultaneous satisfaction of the idle learning condition and the most delayed angle learning condition. For the better understanding, the following description sequentially regards the processing flow executed in the case of satisfaction of the idle learning condition by setting the idle learning condition flag F1 to 1 and resetting the most delayed angle learning condition flag F2 to 0 and the processing flow executed in the case of satisfaction of the most delayed angle learning condition by resetting the idle learning condition flag F1 to 0 and setting the most delayed angle learning condition flag F2 to 1.

In response to the idle learning condition flag F1 set to 1 and the most delayed angle learning condition flag F2 set to 0, that is, upon satisfaction of the idle learning condition, the CPU 24a gives a learning instruction to start learning the idle control amount (step S120). In response to the learning instruction for learning the idle control amount, the engine ECU 24 executes an idle learning routine shown in the flowchart of FIG. 8. The idle learning routine of FIG. 8 is explained below with temporary suspension of the description of the learning instruction routine shown in the flowchart of FIG. 7.

In the idle learning routine, the CPU 24a resets the idle learning completion flag G1 to 0 and stores the setting of the idle learning completion flag G1 into the RAM 24c (step S300) and starts learning the idle control amount (step S310). Upon completion of learning the idle control amount (step S320), the CPU 24a sets the idle learning completion flag G1 to 1 and stores the setting of the idle learning completion flag G1 into the RAM 24c (step S330) and terminates the idle learning routine. A concrete procedure of learning the idle control amount learns a control amount (for example, a throttle position of the throttle valve 124) required to make the rotation speed Ne of the engine 22 equal to the idle rotation speed Nidl. The learnt idle control amount is stored into the RAM 24c and is used for subsequent control to idle the engine 22. Such learning gives the adequate and suitable control amount for idling the engine 22.

Figure 8:
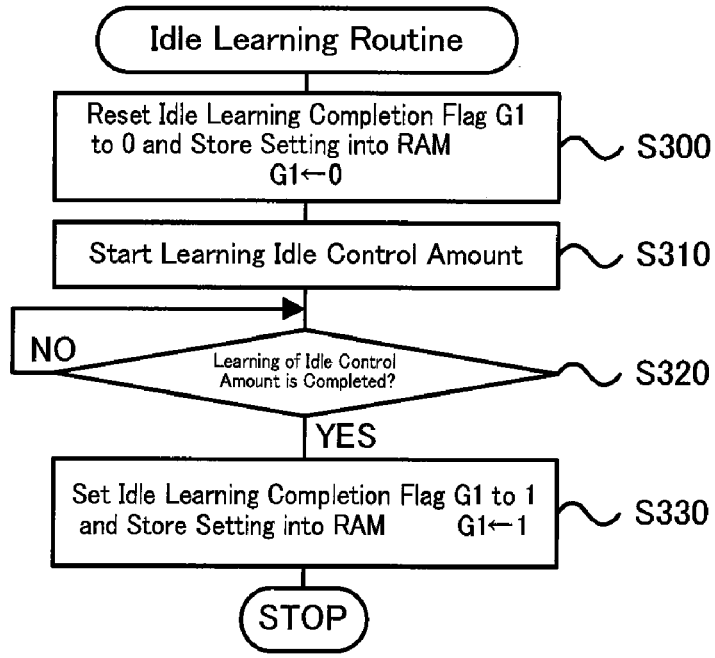
FIG. 8 is a flowchart showing an idle learning routine.

Referring back to the learning instruction routine in the flowchart of FIG. 7, after giving the learning instruction to start learning the idle control amount at step S120, the CPU 24a inputs the setting of the idle learning completion flag G1 stored in the RAM 24c according to the idle learning routine of FIG. 8 (step S130). The CPU 24a subsequently checks the input setting of the idle learning completion flag G1 and waits for the setting of the idle learning completion flag G1 to 1, that is, completion of learning the idle control amount (step S140). Upon completion of learning the idle control amount, the CPU 24a performs control to satisfy the learning condition of the most delayed angle control amount (step S150). As mentioned above, satisfaction of the learning condition of the most delayed angle control amount is determined on the premise of satisfaction of the condition that the open-close timing of the intake valve 128 is sufficiently close to the most delayed angle and the condition that the rotation speed Ne of the engine 22 is not lower than the idle rotation speed Nidl or the rotation speed of slightly lower than the idle rotation speed Nidl. In this state, only the learning condition of the idle control amount is satisfied, whereas the learning condition of the most delayed angle control amount is not satisfied. The rotation speed Ne of the engine 22 is thus expected to be approximate to the idle rotation speed Nidl. The processing of step S150 controls the variable valve timing mechanism 150 to make the open-close timing of the intake valve 128 sufficiently close to the most delayed angle. A concrete procedure actuates the oil control valve 156 to apply a hydraulic pressure to the delay chamber of the VVT controller 152.

The CPU 24a then waits for satisfaction of the most delayed angle learning condition by the control of the variable valve timing mechanism 150 to make the open-close timing of the intake valve 128 sufficiently close to the most delayed angle (step S160) and gives a learning instruction to start learning the most delayed angle control amount (step S170). In response to the learning instruction for learning the most delayed angle control amount, the engine ECU 24 executes a most delayed angle learning routine shown in the flowchart of FIG. 9. The most delayed angle learning routine of FIG. 9 is explained below with temporary suspension of the description of the learning instruction routine shown in the flowchart of FIG. 7.

In the most delayed angle learning routine, the CPU 24a resets the most delayed angle learning completion flag G2 to 0 and stores the setting of the most delayed angle learning completion flag G2 into the RAM 24c (step S400) and starts learning the most delayed angle control amount (step S410). Upon completion of learning the most delayed angle control amount (step S420), the CPU 24a sets the most delayed angle learning completion flag G2 to 1 and stores the setting of the most delayed angle learning completion flag G2 into the RAM 24c (step S430) and terminates the most delayed angle learning routine. A concrete procedure of learning the most delayed angle control amount delays the open-close timing of the intake valve 128 to the most delayed angle and learns a control amount at the most delayed angle (for example, a hydraulic pressure applied to the delay chamber of the VVT controller 152 via the oil control valve 156). The learnt most delayed angle control amount is stored into the RAM 24c and is used for subsequent control to delay the open-close timing of the intake valve 128 to the most delayed angle. Such learning gives the adequate and suitable control amount for delaying the open-close timing of the intake valve 128 to the most delayed angle.

Figure 9:
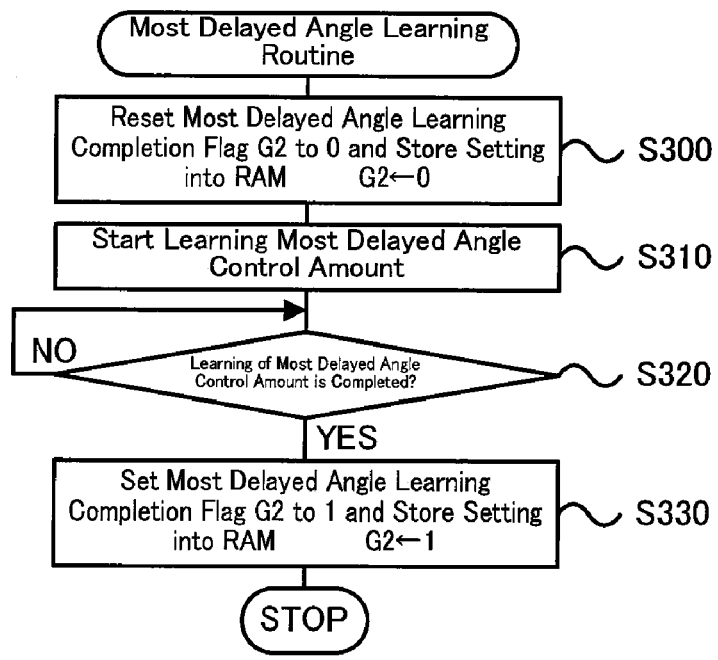
FIG. 9 is a flowchart showing a most delayed angle learning routine.

Referring back to the learning instruction routine in the flowchart of FIG. 7, after giving the learning instruction to start learning the most delayed angle control amount at step S170, the CPU 24a inputs the setting of the most delayed angle learning completion flag G2 stored in the RAM 24c according to the most delayed angle learning routine of FIG. 9 (step S180). The CPU 24a subsequently checks the input setting of the most delayed angle learning completion flag G2 and waits for the setting of the most delayed angle learning completion flag G2 to 1, that is, completion of learning the most delayed angle control amount (step S190). The CPU 24a then terminates the learning instruction routine of FIG. 7. Upon satisfaction of the idle learning condition, the procedure of the embodiment successively performs learning of the idle control amount and learning of the most delayed angle control amount in this sequence. This arrangement promptly implements learning of the idle control amount and learning of the most delayed angle control amount and desirably shortens the total time required for completion of learning both the idle control amount and the most delayed angle control amount, compared with the conventional procedure of individually learning only the idle control amount. In the hybrid vehicle 20 of the embodiment equipped with the engine 22 that is restarted from the stop state to satisfy the learning condition and perform learning, the sequential learning of both the idle control amount and the most delayed angle control amount desirably reduces the frequency of restarting the engine 22 for learning.

In response to the idle learning condition flag F1 set to 0 and the most delayed angle learning condition flag F2 set to 1 at step S110, that is, upon satisfaction of the most delayed angle learning condition, on the other hand, the CPU 24*a* gives a learning instruction to start learning the most delayed angle control amount (step S200). The most delayed angle learning routine of FIG. 9 is then performed to set the most delayed angle learning completion flag G2 to 1. The CPU 24*a* waits for completion of learning the most delayed angle control amount (steps S210 and S220) and makes control to satisfy the idle learning condition (step S230). As mentioned above, satisfaction of the idle learning condition is determined on the premise of satisfaction of the condition that the engine 22 idles and the condition that the cooling water temperature Tw of the engine 22 input from the water temperature sensor 142 is not lower than the preset reference temperature. In this state, only the learning condition of the most delayed angle control amount is satisfied, whereas the learning condition of the idle control amount is not satisfied. The rotation speed Ne of the engine 22 is thus expected to be not lower than the idle rotation speed Nidl or the rotation speed of slightly less than the idle rotation speed Nidl. The processing of step S200 operates and controls the throttle motor 136 and the fuel injection valve 126 to idle the engine 22 and make the cooling water temperature Tw of the engine 22 not lower than the preset reference temperature.

The CPU 24*a* then waits for satisfaction of the idle learning condition by the control to idle the engine 22 and make the cooling water temperature Tw not lower than the preset reference temperature (step S240), and gives a learning instruction to start learning the idle control amount (step S250). The idle learning routine of FIG. 8 is then performed to set the idle learning completion flag G1 to 1 (step S260). The CPU 24*a* waits for completion of learning the idle control amount (step S270) and terminates the learning instruction routine. Upon satisfaction of the most delayed angle learning condition, the procedure of the embodiment successively performs learning of the most delayed angle control amount and learning of the idle control amount in this sequence. This arrangement promptly implements learning of the most delayed angle control amount and learning of the idle control amount and desirably shortens the total time required for completion of learning both the most delayed angle control amount and the idle control amount, compared with the conventional procedure of individually learning only the most delayed angle control amount. In the hybrid vehicle 20 of the embodiment equipped with the engine 22 that is restarted from the stop state to satisfy the learning condition and perform learning, sequential learning of both the most delayed angle control amount and the idle control amount desirably reduces the frequency of restarting the engine 22 for learning.

As described above, upon satisfaction of the idle learning condition or upon satisfaction of the most delayed angle learning condition, the hybrid vehicle 20 of the embodiment performs both learning of the idle control amount and learning of the most delayed angle control amount. This arrangement promptly implements learning of the idle control amount and learning of the most delayed angle control amount and desirably shortens the total time required for completion of learning both the idle control amount and the most delayed angle control amount, compared with the conventional procedure of individually learning only one control amount corresponding to the satisfied learning condition. The hybrid vehicle 20 of the embodiment sequentially performs learning of the idle control amount and learning of the most delayed angle control amount. In the vehicle equipped with the engine 22 that is restarted from the stop state to satisfy the learning condition and perform learning, this arrangement desirably reduces the frequency of restarting the engine 22 for learning.

After completion of learning the idle control amount under satisfaction of the idle learning condition, the hybrid vehicle 20 of the embodiment makes control to satisfy the most delayed angle learning condition and performs learning of the most delayed angle control amount subsequent to learning of the idle control amount. Learning of the most delayed angle control amount may, however, be skipped in the case of completion of learning the most delayed angle control amount. Similarly after completion of learning the most delayed angle control amount under satisfaction of the most delayed angle learning condition, the hybrid vehicle 20 of the embodiment makes control to satisfy the idle learning condition and performs learning of the idle control amount subsequent to learning of the most delayed angle control amount. Learning of the idle control amount may, however, be skipped in the case of completion of learning the idle control amount. Such arrangement desirably avoids unnecessary relearning of the same control amount after completion of learning.

The driver may step on the accelerator pedal 53 of the hybrid vehicle 20 in the course of successively learning the idle control amount and the most delayed angle control amount in this sequence upon satisfaction of the idle learning condition according to the learning instruction routine of FIG. 7. The driver may also step on the accelerator pedal 53 in the course of successively learning the most delayed angle control amount and the idle control amount in this sequence upon satisfaction of the most delayed angle learning condition according to the learning instruction routine of FIG. 7. The above embodiment does not specifically mention such a case of making the learning condition unsatisfied during execution of learning. In this case, the processing flow goes to the processing of step S100 and waits for re-satisfaction of either the idle learning condition or the most delayed angle learning condition. Upon satisfaction of the idle learning condition, the processing flow performs the processing of and after step S120. Upon satisfaction of the most delayed angle learning condition, on the other hand, the processing flow performs the processing of and after step S200. Relearning of the same control amount may be skipped after completion of learning.

Upon satisfaction of the idle learning condition, the hybrid vehicle 20 of the embodiment successively performs learning of the idle control amount and learning of the most delayed angle control amount in this sequence. Upon satisfaction of the most delayed angle learning condition, on the other hand, the hybrid vehicle 20 of the embodiment successively performs learning of the most delayed angle control amount and learning of the idle control amount in this sequence. One possible modification may successively perform learning of the idle control amount and learning of the most delayed angle control amount in this sequence or may successively perform learning of the most delayed angle control amount and learning of the idle control amount in this sequence, whether the idle learning condition is satisfied or the most delayed angle learning condition is satisfied.

The hybrid vehicle 20 of the embodiment determines satisfaction or dissatisfaction of the idle learning condition, on the premise of satisfaction of the condition that the engine 22 idles and the condition that the cooling water temperature Tw of the engine 22 input from the water temperature sensor 142 is not lower than the preset reference temperature (for example, 65 degrees or 70 degrees). In one modification, satisfaction or dissatisfaction of the idle learning condition may be determined on the premise of satisfaction of only the condition that the engine 22 idles. The hybrid vehicle 20 of the embodiment determines satisfaction or dissatisfaction of the most delayed angle learning condition, on the premise of satisfaction of the condition that the open-close timing of the intake valve 128 is sufficiently close to the most delayed angle and the condition that the rotation speed Ne of the engine 22 is not lower than the idle rotation speed Nid1 or the rotation speed of slightly less than the idle rotation speed Nid1. In one modification, satisfaction or dissatisfaction of the most delayed angle learning condition may be determined on the premise of satisfaction of only the condition that the open-close timing of the intake valve 128 is sufficiently close to the most delayed angle.

In the hybrid vehicle 20 of the embodiment, the engine ECU 24 performs the learning instruction routine to give the learning instruction to start learning the control amount, the idle learning routine to learn the idle control amount in response to the learning instruction given by the learning instruction routine, and the most delayed angle learning routine to learn the most delayed angle control amount in response to the learning instruction given by the learning instruction routine. In one modification, these three routines may be combined to one routine. The hybrid vehicle 20 of the embodiment makes control to satisfy the most delayed angle learning condition after completion of learning the idle control amount under satisfaction of the idle learning condition and makes control to satisfy the idle learning condition after completion of learning the most delayed angle control amount under satisfaction of the most delayed angle learning condition according to the learning instruction routine. The learning instruction routine may be designed to give only control instructions to make such controls, and the actual control operations may be performed according to separate control routines.

The hybrid vehicle 20 of the embodiment performs learning of the idle control amount and learning of the most delayed angle control amount. Learning of the most delayed angle may be replaced by learning of a certain control amount performed upon satisfaction of a condition that the open-close timing of the intake valve 128 is sufficiently close to a preset reference timing, in order to set the open-close timing of the intake valve 128 to a preset reference timing.

The hybrid vehicle 20 of the embodiment is equipped with the hydraulic-type variable valve timing mechanism 150. The variable valve timing mechanism is, however, not restricted to the hydraulic type but may be an electrically powered type.

Figure 10:
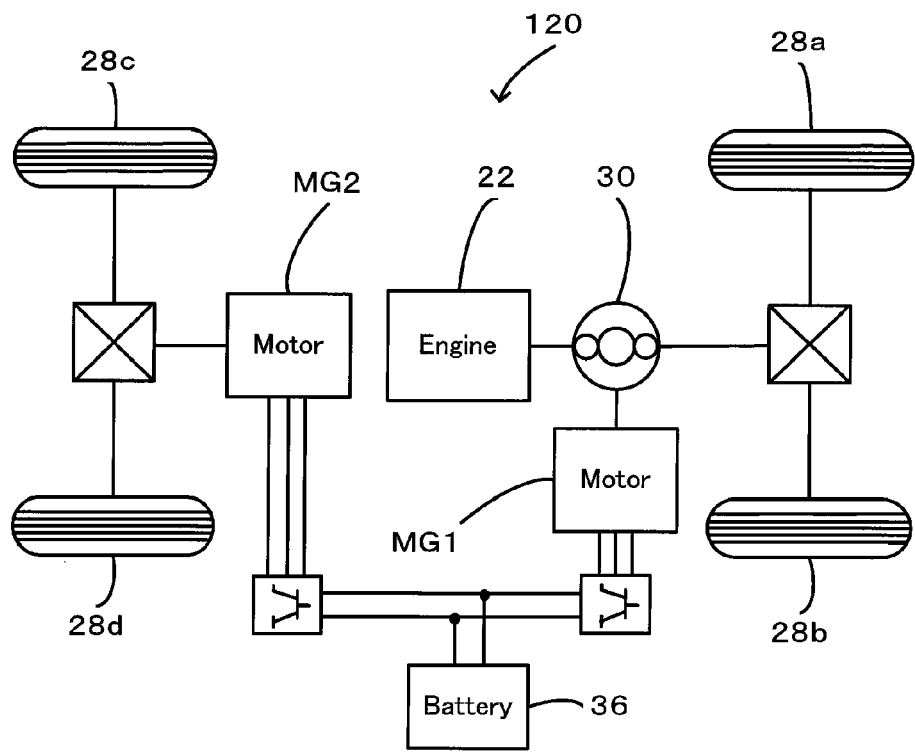
FIG. 10 schematically illustrates the configuration of another hybrid vehicle 120 in one modified example.

In the hybrid vehicle 20 of the embodiment, the power of the motor MG2 is output to the driveshaft 29. The technique of the invention may be applicable to a hybrid vehicle 120 of a modified structure shown in FIG. 10. In the hybrid vehicle 120 of FIG. 10, the power of the motor MG2 is connected to another axle (an axle linked with wheels 28c and 28d) that is different from the axle connecting with the driveshaft 29 (the axle linked with drive wheels 28a and 28b).

Figure 11:
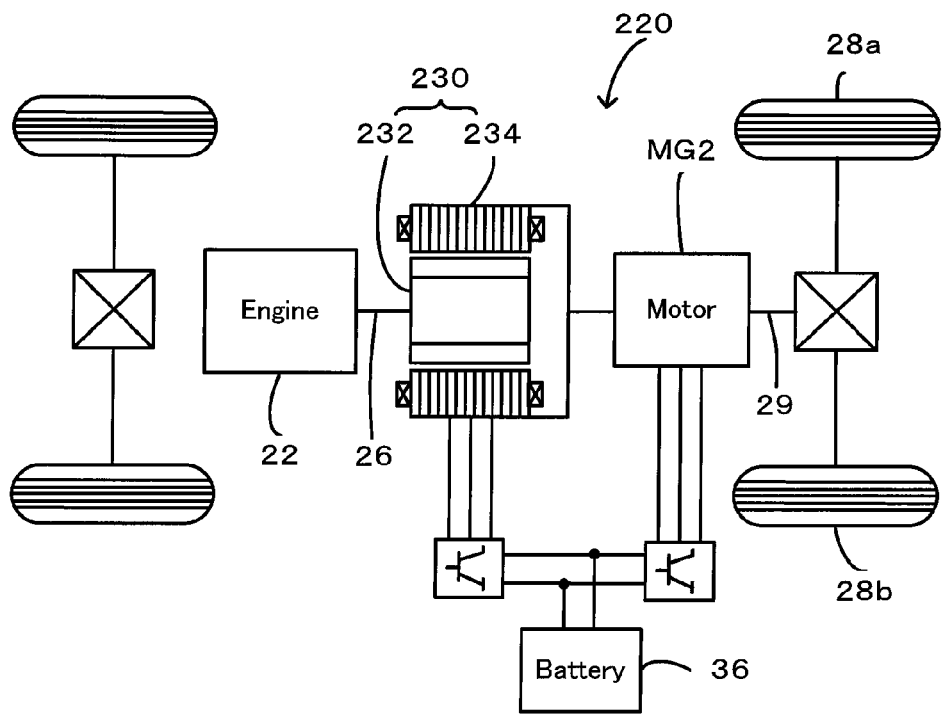
FIG. 11 schematically illustrates the configuration of still another hybrid vehicle 220 in another modified example.

In the hybrid vehicle 20 of the embodiment, the power of the engine 22 is output via the power distribution integration mechanism 30 to the driveshaft 29 linked with the drive wheels 28a and 28b. In another possible modification of FIG. 11, a hybrid vehicle 220 may have a pair-rotor motor 230, which has an inner rotor 232 connected with the crankshaft 26 of the engine 22 and an outer rotor 234 connected with the drive shaft 29 and transmits part of the power output from the engine 22 to the drive shaft 29 while converting the residual part of the power into electric power.

The embodiment regards the motor vehicle drivable with both the output power of the internal combustion engine and the output power of the motor. The technique of the invention is, however, not restricted to motor vehicles of such configuration but is applicable to motor vehicles drivable with only the output power of the internal combustion engine. The technique of the invention is also actualized by diversity of other applications, for example, an internal combustion engine system mounted on any of various moving bodies, such as diverse vehicles other than the motor vehicles, ships and boats, and aircraft, and an internal combustion engine system incorporated in any of various stationary equipment, such as construction machinery, as well as a control method of such an internal combustion engine system.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

Industrial Applicability

The present invention is preferably applied to the manufacturing industries of internal combustion engine systems and vehicles.

The invention claimed is:

1. An internal combustion engine system equipped with an open-close timing variation mechanism constructed to vary an open-close timing of an intake valve for an internal combustion engine, the internal combustion engine system comprising:

a learning instruction module configured to, upon satisfaction of an idle learning condition for learning a control amount required to idle the internal combustion engine as an idle control amount or an open-close timing learning condition for learning a control amount required to set an open-close timing of the intake valve to a specific open-close timing as an open-close timing control amount, give a learning instruction to perform learning of one of the idle control amount and the open-close timing control amount for which the learning condition has been satisfied, perform control to satisfy a condition for learning the other one of the idle control amount and the open-close timing control amount after completion of the learning of the one of the idle control amount and the open-close timing control amount, and give a learning instruction to perform learning of the other one of the idle control amount and the open-close timing control amount after the condition for learning the other one of the idle control amount and the open-close timing control amount is satisfied;

an idle learning module configured to learn the idle control amount, in response to the learning instruction given by the learning instruction module; and an open-close timing learning module configured to learn the open-close timing control amount, in response to the learning instruction given by the learning instruction module.

2. The internal combustion engine system in accordance with claim 1, wherein the specific open-close timing represents a most delayed open-close timing among available options of the open-close timing of the intake valve.

3. The internal combustion engine system in accordance with claim 1, wherein the learning instruction module does not instruct the idle learning module to repeat learning the idle control amount if the learning of the idle control amount has been completed, and does not instruct the open-close timing learning module to repeat learning the open-close timing control amount if the learning of the open-close timing control amount has been completed.

4. The internal combustion engine system in accordance with claim 1, wherein the learning instruction module determines satisfaction of the idle learning condition and gives the learning instruction, when the internal combustion engine idles.

5. The internal combustion engine system in accordance with claim 4, the internal combustion engine system further having:

an intake air flow regulator configured to regulate an intake air flow into the internal combustion engine; and an intake air flow regulation controller configured to control the intake air flow regulator to satisfy the idle learning condition, in response to an instruction given by the learning instruction module, wherein the learning instruction module instructs the open-close timing learning module, upon satisfaction of the open-close timing learning condition, to learn the open-close timing control amount, instructs the intake air flow regulator to satisfy the idle learning condition after completion of learning the open-close timing control amount by the open-close timing learning module, and instructs the idle learning module to learn the idle control amount after satisfaction of the idle learning condition.

6. The internal combustion engine system in accordance with claim 1, wherein the learning instruction module determines satisfaction of the open-close timing learning condition and gives the learning instruction, when the open-close timing of the intake valve is in a predetermined range including the specific open-close timing.

7. The internal combustion engine system in accordance with claim 6, the internal combustion engine system further having:

an open-close timing variation controller configured to control the open-close timing variation mechanism to satisfy the open-close timing learning condition in response to an instruction given by the learning instruction module, wherein the learning instruction module instructs the idle learning module, upon satisfaction of the idle learning condition, to learn the idle control amount, instructs the open-close timing variation controller to satisfy the open-close timing learning condition after completion of learning the idle control amount by the idle learning module, and instructs the open-close timing learning module to learn the open-close timing control amount after satisfaction of the open-close timing learning condition.

8. A vehicle equipped with the internal combustion engine system configured to output power to an axle and with a motor configured to enable power output to the axle, the vehicle comprising:

a learning instruction module configured to, upon satisfaction of an idle learning condition for learning a control amount required to idle the internal combustion engine as an idle control amount or an open-close timing learning condition for learning a control amount required to set an open-close timing of the intake valve to a specific open-close timing as an open-close timing control amount, give a learning instruction to perform learning of one of the idle control amount and the open-close timing control amount for which the learning condition has been satisfied, perform control to satisfy a condition for learning the other one of the idle control amount and the open-close timing control amount after completion of the learning of the one of the idle control amount and the open-close timing control amount, and give a learning instruction to perform learning of the other one of the idle control amount and the open-close timing control amount after the condition for learning the other one of the idle control amount and the open-close timing control amount is satisfied;

an idle learning module configured to learn the idle control amount, in response to the learning instruction given by the learning instruction module; and an open-close timing learning module configured to learn the open-close timing control amount, in response to the learning instruction given by the learning instruction module.

9. A control method of an internal combustion engine system equipped with an open-close timing variation mechanism constructed to vary an open-close timing of an intake valve for an internal combustion engine, comprising:

(a) upon satisfaction of an idle learning condition for learning a control amount required to idle the internal combustion engine as an idle control amount or an open-close timing learning condition for learning a control amount required to set an open-close timing of the intake valve to a specific open-close timing as an open-close timing control amount, giving a learning instruction to perform learning of one of the idle control amount and the open-close timing control amount for which the learning condition has been satisfied;

(b) learning the one of the idle control amount and the open-close timing control amount in response to the learning instruction;

(c) after completion of the learning of the one of the idle control amount and the open-close timing control amount in step (b), performing control to satisfy a condition for learning the other one of the idle control amount and the open-close timing control amount;

(d) after the condition for learning the other one of the idle control amount and the open-close timing control amount is satisfied, giving a learning instruction to perform learning of the other one of the idle control amount and the open-close timing control amount.

* * * * *

UNITED STATES PATENT AND TRADEMARK OFFICE
CERTIFICATE OF CORRECTION

PATENT NO. : 8,386,152 B2
APPLICATION NO. : 12/297415
DATED : February 26, 2013
INVENTOR(S) : Ichimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

First Day of September, 2015

Michelle K. Lee
*Director of the United States Patent and Trademark Office*